Jan. 7, 1958 R. S. ZEBARTH 2,818,600
METHOD OF CONVEYING POULTRY THROUGH PROCESSING EQUIPMENT
Filed Dec. 6, 1954 2 Sheets-Sheet 1
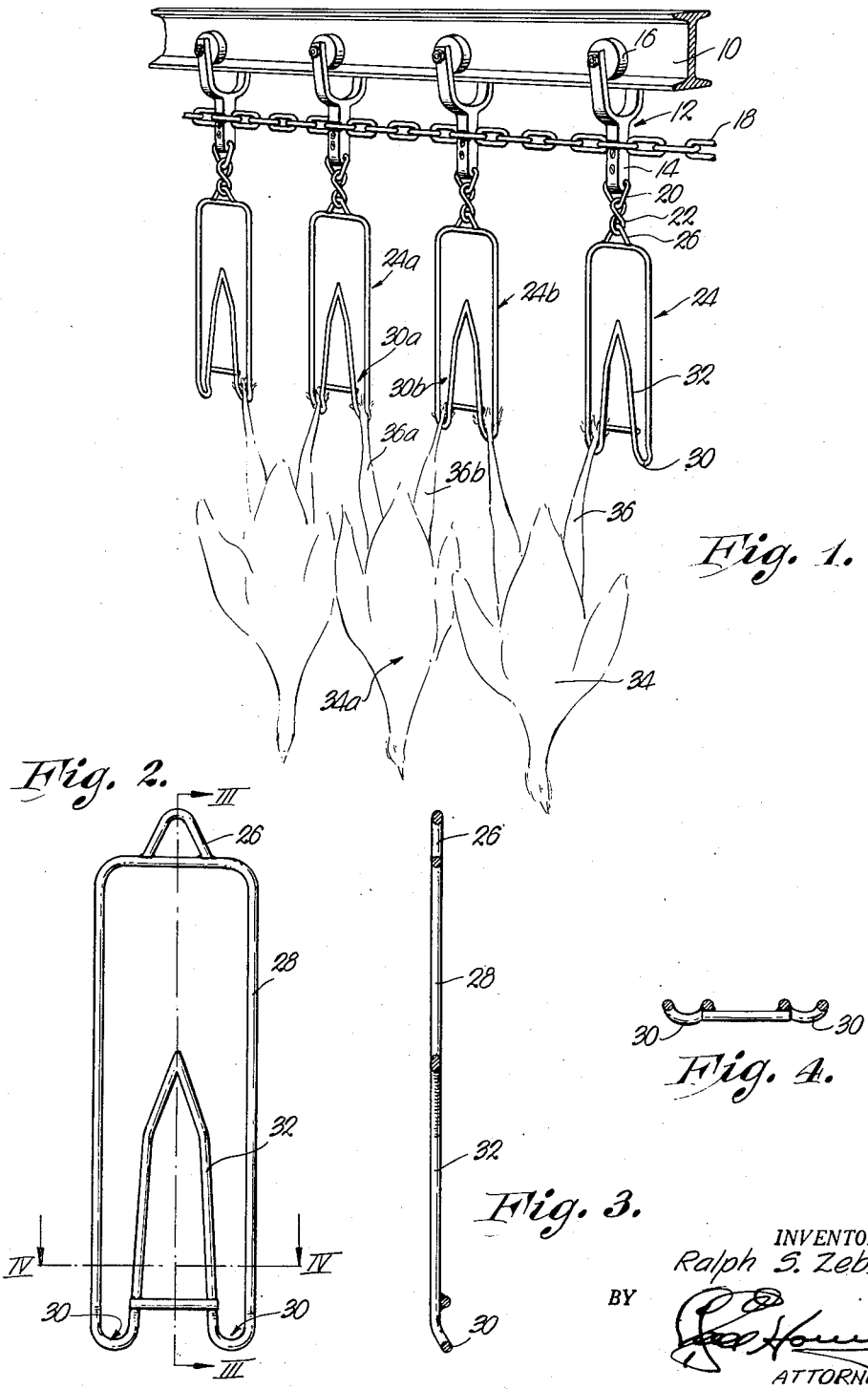
INVENTOR.
Ralph S. Zebarth
BY
ATTORNEY.

United States Patent Office 2,818,600
Patented Jan. 7, 1958

2,818,600

METHOD OF CONVEYING POULTRY THROUGH PROCESSING EQUIPMENT

Ralph S. Zebarth, Hickman Mills, Mo., assignor to Gordon Johnson Equipment Company, Kansas City, Mo.

Application December 6, 1954, Serial No. 473,309

4 Claims. (Cl. 17—45)

This invention relates to the method of processing poultry such as chickens, turkeys and other fowl, and has for its primary object the provision of a series of novel steps of suspension, interconnection, advancement and the like in a manner to facilitate carrying out of various operations necessary for placing the bird in condition for consumer use and to render the processing equipment to which the poultry is subjected, more efficient in its operation.

It is common practice in poultry processing plants to provide an endless conveyor system or other means of advancement of the poultry from station to station where various operations take place including scalding, removal of feathers, evisceration and the like. To this end the birds are normally suspended by their legs or necks from the overhead conveyor through use of shackles of various types.

Normally, the conveyor system includes a shackle for each bird respectively and each shackle is in turn connected with the conveyor through use of a chain or other suspension means for freedom of swinging and/or rotational movement. Consequently, as the birds are advanced through the various stations and particularly through equipment that imparts mechanical forces thereto, such freedom of movement adversely affects the proper desired operation of the equipment; therefore, various means have heretofore been suggested to guide the birds properly in an attempt to avoid the undesired movement thereof with respect to the conveyor equipment through which the birds are advanced.

The unrestrained swinging and rotational movement of the birds as the same are suspended from the continuously moving conveyor is particularly objectionable when the birds are advanced through mechanical pickers. Such equipment normally includes opposed, rotatable picking drums having flexible fingers that slap and wipe against the carcasses to pull the feathers therefrom.

This mechanical force that is imparted to the birds tends to deflect the same especially in a direction opposite to the path of travel of the birds resulting in incomplete picking and requiring considerable hand labor for final finishing operations.

It is accordingly the most important object of the instant invention to provide in a method of processing poultry an initial step of interconnecting the legs of a plurality of birds in a continuous series so that when the same are advanced through the various stations of processing the same, the pulling force is transmitted from bird to bird and thereby equalized throughout the line.

Another object of the present invention is to provide a method wherein, as the birds are suspended from an overhead conveyor, the legs are interconnected so that rotation thereof is avoided and particularized areas of the birds are held in desired positions when the aforementioned mechanical forces are applied thereto.

Another important object of the present invention is to interconnect the legs of the birds by placing one leg of each bird in one shackle of the conveyor and the other leg in an adjacent shackle so that as the conveyor is advanced to pull the birds successively through processing equipment, such as feather picking machines, the birds will remain in flank-to-flank relationship and the breasts, as well as the backs of the birds, will be properly subjected to the picking fingers as well as to other equipment in the line and to workers who perform certain hand operations as the poultry is advanced continually at a predetermined speed.

A still further object of this invention is to provide a method of processing poultry that is particularly advantageous in the feather-removing steps by virtue of the fact that the legs are held apart under tension so that the picking fingers will effectively remove feathers from the legs and the body of the fowl in and around the cracks and crevices where the legs join with the body.

Other important objects will become apparent as the method of the instant invention is hereinafter more fully explained, reference being had to the accompanying drawings, illustrating by way of example, a preferred embodiment of apparatus capable of carrying out the method and wherein:

Figure 1 is a perspective view illustrating a plurality of birds suspended from an overhead conveyor through use of shackles in a manner contemplated by the method of the instant invention.

Fig. 2 is an elevational view of one of the shackles entirely removed from the conveyor.

Fig. 3 is a cross-sectional view taken on line III—III of Fig. 2.

Fig. 4 is a cross-sectional view taken on line IV—IV of Fig. 2; and

Figure 5:
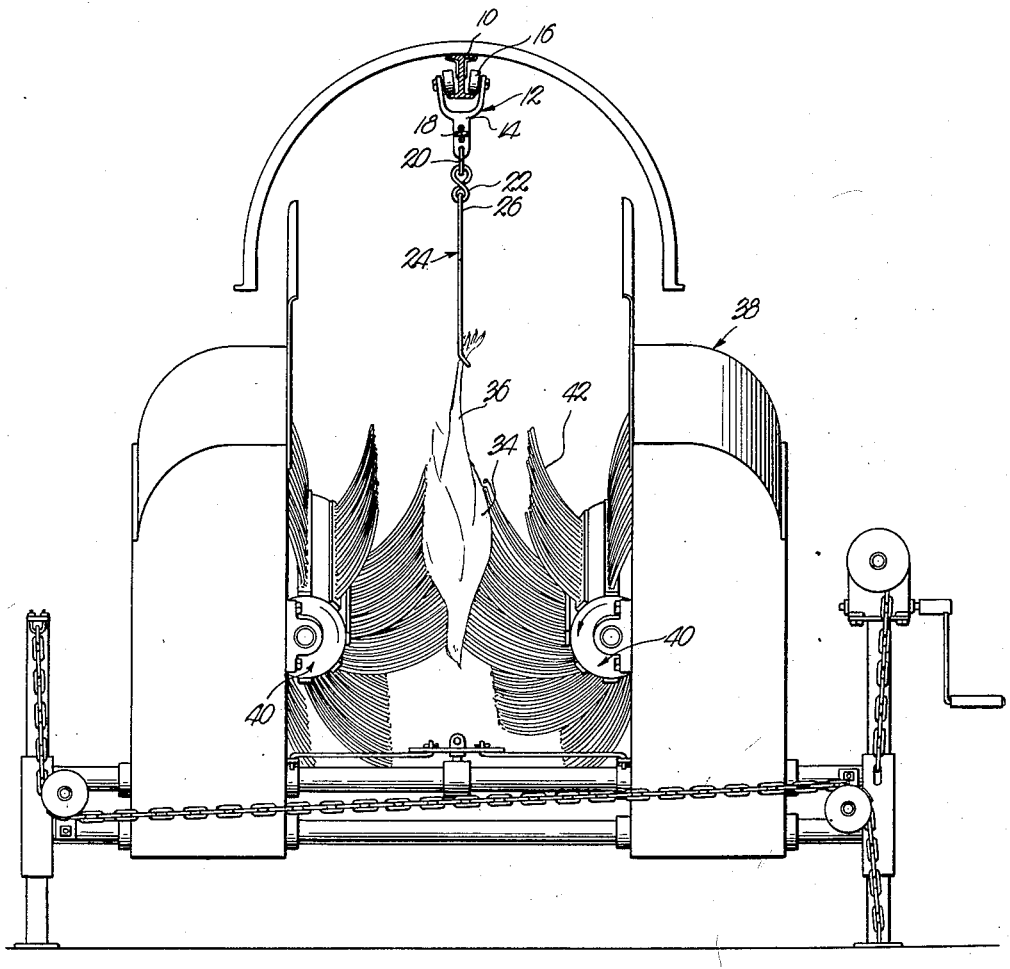
Fig. 5 is an end elevational view of one type of poultry picking machine with which the instant method is especially adapted to be used.

No claim is herein made to the novelty of the apparatus shown in the drawings and selected for teaching the method of the present invention, it being understood that such method may be carried out through use of various types of structures other than that illustrated.

The conveyor per se is fully illustrated and described in my copending application, Serial No. 433,494, filed June 1, 1954. Briefly, it consists of an I-beam 10 acting as a track supporting a plurality of identical hangers 12, including a Y-shaped yoke 14 having the legs thereof provided with rollers 16 that engage the track 10. The stems of the yokes 14 pass through links in chain 18, thereby interconnecting the hangers 12 and maintaining the same in predetermined spaced relationship. A triangular-shaped eyelet 20 swingable on the stem of each yoke 14 in turn swingably receives a hook 22 that supports a shackle 24.

Here again, the precise nature of the shackles 24 is of no consequence and reference may be had to my Patent No. D. 166,583, of April 22, 1952, for a modification thereof which may well be adapted for carrying out the method hereinafter to be more fully described. Shackle 24 is shown provided with a suitable loop 26 at its uppermost end for pivotal connection with the hook 22.

The shackel 24 is more specifically shown in Figs. 2 to 4 inclusive and consists in addition to the loop 26, a continuous wire frame 28 bent to present leg-receiving loops 30 and a substantially triangular-shaped divider 32 between the two loops 30. As is particularly evident from viewing Figs. 3 and 4 of the drawings, the lowermost arcuate or closed ends of the loops 30—30 are bent laterally so that when birds 34 are suspended from the shackels 24 by their legs 36, the said birds 34 will hang substantially straight as shown in Fig. 5.

The structure hereinabove outlined is shown in Fig. 5 of the drawings in association with a feather picking machine broadly designated by the numeral 38. The precise nature of the machine 38 is of no consequence to the carrying out of the method of the instant invention.

As is quite common in machines of this type, a pair of oppositely rotating reels or drums 40 are provided with a number of series of elongated, flexible picking fingers 42 that extend radially therefrom during rotation of the reels 40—40 and which slap and wipe against the birds 34 as the same are advanced between the reels 40—40 to exert a downward pull upon the feathers and thereby remove the same from the poultry.

It is seen, therefore, that freedom of swinging movement of the birds as they hang from the continuously moving conveyor is detrimental to effective and proper removal of the feathers in this particular stage of the entire processing operation. Further, if the bird is permitted to rotate as the same passes between the fingers 42 of the two reels 40—40, many feathers particularly on the backs and breasts in and around the wings and on the legs and necks will not be removed, oftentimes requiring laborious hand plucking.

According to the method of the instant invention, therefore, the legs 36 of the series of birds 34 are interconnected as a unit simultaneously with the initial step of suspending the same from the conveyor through use of shackels 24. For example, as seen in Fig. 1, bird 34a has one of its legs 36a hooked into loop 30a of shackel 24a and its other leg 36b hooked into loop 30b of shackel 24b. The carcass 34a is, therefore, suspended by two shackels 24a and 24b. When the remaining birds 34 are similarly suspended with the one leg 36 received in one shackel 24 and the other leg 36 received in an adjacent shackel 24, the continuous series of birds are effectively interconnected and their legs are held spread apart under tension, the extent of spreading being determined by the distance between the stems of the yokes 14 which can easily be changed because they merely extend through a link in the chain 18.

Such novel suspension of the poultry places their flanks in side-by-side relationship in substantial alignment and aligned with the path of travel thereof upon actuation of the conveyor. By the same token, the breasts and the backs of all of the birds 34 face outwardly and transversely to such path of travel.

The advantage of such disposition of the breasts and backs which are not difficult to de-feather, becomes evident in viewing Fig. 5, where it can be seen that the opposed flexible fingers 42 slap directly against both the backs and the breasts of the birds 34.

The poultry may be conveyed through the various processing steps and past the multitude of equipment normally utilized in the complete slaughtering process in this same manner if desired, and at no time is any bird permitted to rotate or to swing toward and away from adjacent birds.

As soon as a pull is exerted upon the chain 18, such pulling force is transmitted from bird to bird throughout the length of the series thereof and when any bird is first subjected to the action of the fingers 42, it cannot be deflected rearwardly or forwardly by the action of fingers 42. Each bird 34 remains hanging in a substantially vertical position as shown in Fig. 5, since each is held against too rapid advancement and each is pulled along without retardation by the birds proximal thereto.

The maintenance of the legs 36 in a spread-apart condition under substantially equalized tension, is especially advantageous in the feather picking step of the process since the relatively long, flexible fingers 42 are then permitted to enter into all cracks and crevices of the poultry such as in and around the legs adjacent the body. Furthermore, the backs and breasts are not only in proper positions with respect to the fingers 42, but such fingers will also strip the wings and necks of the birds of even the smallest pin feathers, since here again, the fingers enter around the body of the bird where the wings are attached thereto.

In other words, the several sets of longitudinally extending series of fingers 42 are spaced-apart and, therefore, tend to envelop the bird and pull the feathers therefrom in comb-like fashion.

In conventional methods the suspended poultry tends to swing and rotate to various positions where the fingers of picking equipment of this type cannot enter properly into confined locations around the body of the carcass and remove feathers therefrom.

It is notable further that the method hereinabove described requires no rigid attachment of the poultry to the conveyor, for on the contrary, it is generally desirable to permit the entire series of interconnected birds to swing laterally to some extent and it is for that reason that shackels 24 are shown pivotally connected to the stems of yokes 14 by eyelets 20, hooks 22 and loops 26. As the birds progress through the machine 38 therefore, side deflection thereof by the action of the fingers 42, is not likely retarded and, therefore, no damage will result to the skin of the carcasses.

It is believed unnecessary to disclose other steps in the normal course of processing poultry that is generally used to appreciate the advantages of the method. By way of example however, after scalding and de-feathering, and at the time of evisceration, the birds are presented to the operators in a proper position for further handling and eliminating the necessity of first grasping the bird and turning the same to a convenient position. In the same manner, killing and sticking, whether done automatically or by hand, is facilitated when the birds hang properly from the conveyor in the manner above described.

Those familiar with the entire field to which this invention relates, will appreciate the many additional advantages not hereinabove enumerated which will emanate from the novel method above described and, therefore, it is desired to be limited only by the spirit of the invention as defined by the scope of the appended claims.

Having thus described the invention what is claimed as new and desired to be secured by Letters Patent is:

1. In a method of processing a series of birds aligned in flank-to-flank relationship within a predetermined path of travel which includes connecting each leg of each bird with one leg of a bird next adjacent thereto in pairs while separately and individually suspending each interconnected pair of legs for substantially free swinging movement; and pulling the birds along said path of travel whereby pulling forces are transmitted from bird to bird throughout the series and the legs of each bird are stretched apart under influence of such forces while the birds are held against relative separation and against rotation.

2. In a method of processing a series of birds aligned in flank-to-flank relationship within a predetermined path of travel which includes separately suspending each leg of each bird for swinging movement of the legs of each bird toward and away from each other while shackling each leg of each bird with a leg of a bird next adjacent thereto to prevent relative movement between the birds; and advancing the birds along said path of travel.

3. In a method of processing a series of birds which includes connecting each leg of each bird with one leg of a bird next adjacent thereto in pairs while suspending each interconnected pair of legs; and advancing the birds along a predetermined path of travel whereby forces of advancement are transmitted from bird to bird throughout the series and the legs of each bird are stretched apart under influence of such forces.

4. In a method of processing a plurality of birds which consists of interconnecting the birds in a continuous series by attaching each leg of each bird to one leg of a bird next adjacent thereto; and exerting a pull upon the birds whereby pulling forces are transmitted from bird to bird throughout the series and the legs of each bird are stretched apart under influence of such forces.

References Cited in the file of this patent

UNITED STATES PATENTS

| | | |
|---|---|---|
| 899,391 | Farrell | Sept. 22, 1908 |
| 2,235,619 | McMahan et al. | Mar. 18, 1941 |
| 2,285,999 | Murphy | June 9, 1942 |
| 2,512,843 | Tomlinson | June 27, 1950 |
| 2,594,829 | Valenta | Apr. 29, 1952 |
| 2,617,145 | Davis | Nov. 11, 1952 |